(12) United States Patent
Carr

(10) Patent No.: US 10,692,017 B2
(45) Date of Patent: Jun. 23, 2020

(54) SYSTEMS AND METHODS FOR PREDICTIVE DOCUMENT CODING USING CONTINUOUS ACTIVE MACHINE LEARNING

(71) Applicant: RINA SYSTEMS, LLC, Cincinnati, OH (US)

(72) Inventor: Terence M Carr, Cincinnati, OH (US)

(73) Assignee: RINA SYSTEMS, LLC, Cincinnati, OH (US)

( * ) Notice: Subject to any disclaimer, the term of this patent is extended or adjusted under 35 U.S.C. 154(b) by 638 days.

(21) Appl. No.: 15/604,261

(22) Filed: May 24, 2017

(65) Prior Publication Data

US 2018/0341875 A1 Nov. 29, 2018

(51) Int. Cl.
*G06N 20/20* (2019.01)
*G06N 20/00* (2019.01)
*G06F 16/35* (2019.01)
*G06F 16/33* (2019.01)
*G06Q 10/10* (2012.01)

(52) U.S. Cl.
CPC ......... *G06N 20/00* (2019.01); *G06F 16/3346* (2019.01); *G06F 16/353* (2019.01); *G06Q 10/101* (2013.01); *G06N 20/20* (2019.01)

(58) Field of Classification Search
CPC .................................................. G06N 20/20
See application file for complete search history.

(56) References Cited

PUBLICATIONS

Chen, et al., Using IBM Enterprise Records, International Technical Support Organization, 2015, pp. 1-440 (Year: 2015).*

* cited by examiner

*Primary Examiner* — Wilbert L Starks
(74) *Attorney, Agent, or Firm* — Ronald L. Rohde

(57) ABSTRACT

Systems and methods for predictive document coding using continuous active machine learning are described herein. A method uses both a primary queue and a plurality of secondary queues, where each secondary queue is associated with a model for category of documents. The method also repeatedly classifies new batches selected from a large set of documents that have not been reviewed. The classification uses the plurality of models and updates the secondary queues from the best documents in the most recently classified batch. While the method transparently cycles through batches, the most relevant documents are provided to one or more human reviewers from secondary queues via a primary queue. The reviewer confirms relevance or non-relevance in each of the documents for each of the categories. Periodically all the models are retrained using the set of reviewed documents after a selectable number of documents have been reviewed since the most recent retraining.

20 Claims, 5 Drawing Sheets

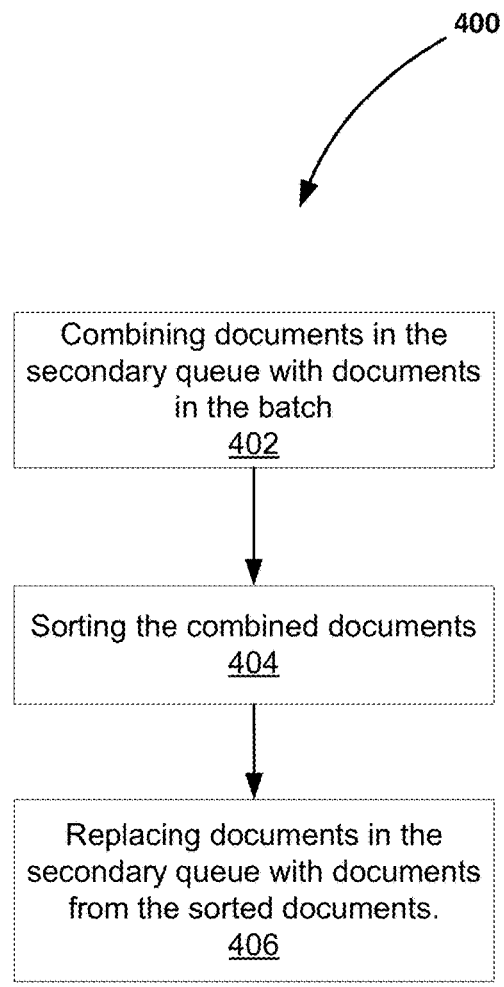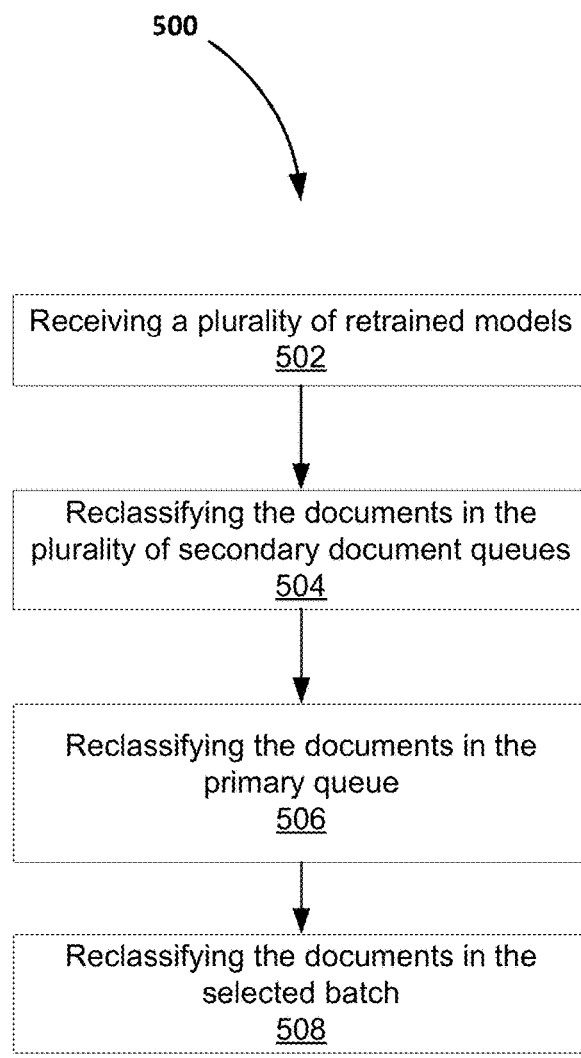
FIG. 4
FIG. 5

SYSTEMS AND METHODS FOR PREDICTIVE DOCUMENT CODING USING CONTINUOUS ACTIVE MACHINE LEARNING

FIELD OF THE PRESENT TECHNOLOGY

The present disclosure relates to systems and methods that provide predictive document coding using continuous active machine learning. Some embodiments utilize unique document review models for each of a plurality of categories (e.g., issues). Documents are processed against these various models to determine relevancy thereto. Most relevant documents from these various queues are fed through a two-stage queue that is made available to document reviewers. As feedback is received the models are continually updated.

SUMMARY

Various embodiments of the present technology include a method for processing a set of electronic documents that have not been reviewed using continuous active machine learning, the method comprising generating a primary queue and a plurality of secondary document queues, each secondary queue specific to one of a plurality of models and including a plurality of documents that have been classified using a plurality of models. The method further includes the steps of a) selecting a batch of documents from the set of documents that have not been reviewed; b) classifying the batch of documents using the plurality of models, each model trained to generate a probability that the document is relevant to at least one of a plurality of tags; c) for each model and model specific secondary queue, replacing at least one document in the model specific secondary queue with a classified document that has a higher probability from the batch, and replacing documents removed from the secondary queue and added to the primary queue; and d) identifying a different batch of documents for selection and returning to step a. While repeatedly executing steps a-d, the method also includes the steps of moving a document at the top of a primary queue to a document review area, pushing a document from the top of a selected secondary queue to the bottom of the primary queue, displaying the document in the document review area to a human reviewer for review, receiving from the reviewer an indication of relevance or non-relevance of the displayed document for each of the plurality of tags, and adding the reviewed document to a reviewed document collection. The method also includes periodically initiating retraining of the plurality of models using reviewed documents in the reviewed document collection, the initiation of the retraining based on a number of reviewed documents that have been added to the reviewed document collection since the most recent retraining.

Various embodiments of the present technology include a system for running three processes asynchronously to present electronic documents to a reviewer while using continuous active machine learning to train a plurality of classification models. The system comprises a document classifier to repeatedly run a first process for: sequentially selecting a batch of documents from universe of documents that have not been reviewed, classifying the batch of documents using the plurality of models to generate for each document a probability for each model, updating each of a plurality of secondary queues with the best documents in the batch for a model associated with the queue, and repeating the first process while sequentially stepping through the universe of documents to select the next batch until all the documents have been classified, and then starting over at the beginning of the universe of documents. The system further includes a document review manager to repeatedly run a second process asynchronously while the first process is running, the second process for: popping a document from the top of a primary queue for display to a reviewer, popping a document from the top of a sequentially selected secondary queue and pushing the popped document to the bottom of the primary queue, receiving from the reviewer an indication of relevance or non-relevance of the displayed document to each of the plurality of tags, updating and adding the updated document to a reviewed document collection, and selecting a different secondary queue and repeating the second process for the next document currently at the top of the primary queue. The system also includes a model training manager to repeatedly run the third process asynchronously while the first and second process are running, the third process for: periodically initiating retraining of the plurality of models, the retraining using the reviewed documents in the reviewed document collection, and classifying all the documents in each the plurality of secondary queues using the retrained models. The system further includes a document review manager for: displaying the document in the document review area to a human reviewer for review, receiving from the reviewer an indication of relevance or non-relevance of the displayed document for each of the plurality of tags, adding the reviewed document to a reviewed document collection; and a model training manager for periodically initiating retraining of the plurality of models based on a number of reviewed documents that have been added to the reviewed document collection since the most recent retraining; and a model trainer for retraining the plurality of models using the reviewed documents in the reviewed document collection and placing the retrained models into the model storage.

Various embodiments of the present technology include a system for presenting electronic documents to a reviewer while using continuous active machine learning to train a plurality of classification models. The system comprises: a model storage for storing a plurality of models each trained for use in generating a probability that a document is relevant to at least one of a plurality of tags; a document classifier for selecting a batch of documents from the set of documents that have not been reviewed and classifying the batch of documents using the plurality of models stored in the model storage to generate a probability for each model, each subsequent batch of documents being a different set of documents from the previous batch; and a secondary queue manager for replacing at least one document in each secondary queue of a plurality of secondary queues, each secondary queue specific to one of the plurality of models, the replaced document in the secondary queue being replaced by a classified document from the batch that has a higher probability than the replaced document in the secondary queue. The system further includes a primary queue manager for moving a document at the top of a primary queue to a document review area, and pushing a document from the top of a selected secondary queue to the bottom of the primary queue, and a document review manager for: displaying the document in the document review area to a human reviewer for review, receiving from the reviewer an indication of relevance or non-relevance of the displayed document for each of the plurality of tags, adding the reviewed document to a reviewed document collection. The system also includes a model training manager for periodically initiating retraining of the plurality of models based on a number of reviewed documents that have been added to the reviewed document collection since the most recent retraining and a model trainer for retraining the plurality of models using the reviewed documents in the reviewed document collection and placing the retrained models into the model storage.

Various embodiments of the present technology include a system for presenting electronic documents to a reviewer while using continuous active machine learning to train a plurality of classification models. the system comprises a model storage for storing a plurality of models each trained for use in generating a probability that a document is relevant to at least one of a plurality of tags; document storage for storing documents that have not been reviewed and can be referenced by a document identifier.

The system also includes a primary queue: containing a list of document references to classified documents, the list in the form of a stack, and each document reference including a document identifier and a plurality of probabilities that the identified document is relevant to a respective tag of the plurality of models; a plurality of secondary queues, each secondary queue: specific to one of the plurality of models, containing a list of document references to classified documents, the list in the form of a stack, and each document reference including a document identifier and a plurality of probabilities that the identified document is relevant to a respective tag of the plurality of models; and a document classifier for: selecting batches of documents from the set of documents that have not been reviewed, each subsequent batch of documents being a different set of documents from the previous batch, classifying each document in a selected batch of documents using the plurality of models, the classification using the plurality of models stored in the model storage to generate a plurality of probabilities that the document is relevant to the respective tags, associating each document reference with the plurality of probabilities generated for the document, and for each batch, replacing at least one document reference in each secondary queue by a document reference from the classified batch, the referenced document having a higher probability of being relevant to the tag associated with the secondary queue than a document referenced in the secondary queue. The system further includes a document review manager for: moving a document referenced by the document reference at the top of a primary queue to a document review area, removing the document reference from the top of the primary queue, pushing a document reference from the top of a selected secondary queue to the bottom of the primary queue, displaying the document in the document review area to a human reviewer for review, receiving from the reviewer an indication of relevance or non-relevance of the displayed document for each of the plurality of tags, revising the document reference for the reviewed document based on the received relevance and non-relevance indications, and adding the revised document reference to a reviewed document collection. The system also includes a model training manager for periodically initiating the retraining of the plurality of models based on a number of reviewed document references that have been added to the reviewed document collection since the most recent retraining; and a model trainer for retraining the plurality of models using the documents referenced in the reviewed document collection and placing the retrained models into the model storage.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 4 illustrates an example method for updating a model specific secondary queues.

FIG. 5 illustrates an example method 500 for reclassifying documents after retraining a plurality of models.

DETAILED DESCRIPTION

Figure 1:
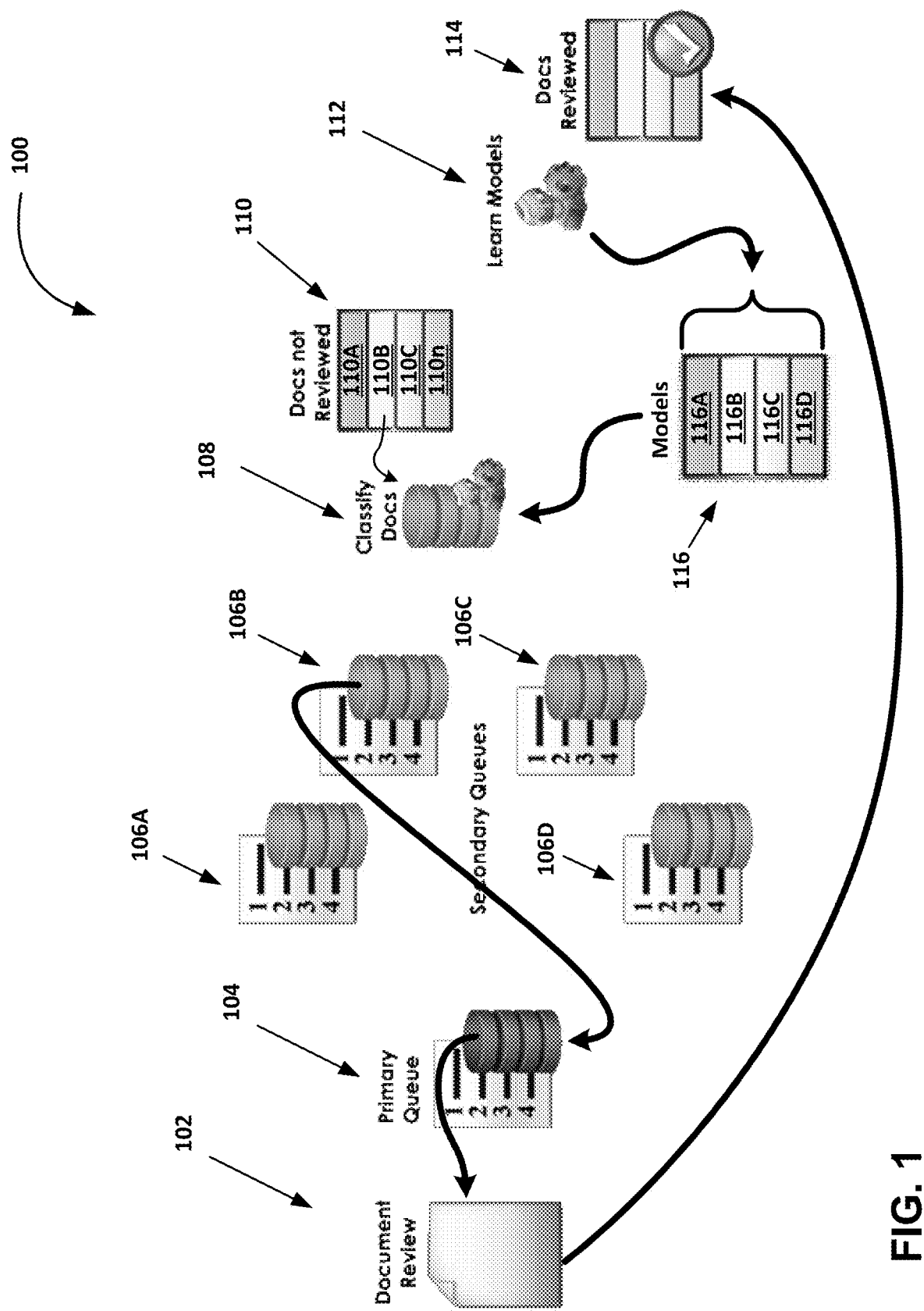
FIG. 1 is a schematic diagram of an example system that is constructed for use in accordance with the present disclosure.

In general, embodiments of the present disclosure are directed to systems and methods that employ active machine learning to create and update document review models based on continuous feedback. These models can be applied to an unprocessed set of documents to determine if the documents are relevant to one or more categories (e.g., medical device test reports, FDA applications, device engineering and prototyping, device marketing, financial documents, etc.). The system uses a plurality of document review models that are each tuned to a specific category. For example, a document review model can be created to process documents and locate those that are relevant to medical device failure reports and then tuned to improve accuracy.

A typical document collection or universe includes 1,000,000 to 10,000,000 documents. However a typical human can only classify or categorize about 45 documents per hour. Perhaps 130 humans could be hired to complete the review of 1,000,000 in about a month. However it would take over 1,300 reviewers to process 10,000,000 documents in the same amount of time. Machine classification of documents can speed the process by several orders of magnitude. However, the accuracy of a machine classifier is often not good enough, and is almost always not as good as human classification.

Feedback from human review of machine classified documents can be used to substantially improve the accuracy of a machine. For example, a machine can classify all of the documents in a 1,000,000 document universe, and then the present most likely documents to a human for review. Then the machine can retrain its models using the reviewed documents. However, the problem is then that the humans could spend most of their time waiting for a machine to process the document universe using updated models. For example, a machine might take about 25-30 minutes to classify all the documents in the document universe. But then after only a few minutes of review by one human or a small group of humans, the models can benefit from retraining, and it's time to reclassify the document universe. So the humans wait another 25-30 minutes for more classified documents to review.

To ensure that human document reviewers are not waiting for excessive time periods in order to receive classified documents for review, the documents for review are received from a primary document queue that is filled from multiple secondary document queues that have been filled with classified documents that have been identified using trained models, and have been further identified to be potentially very relevant documents. The secondary document queues, in turn, are filled from a batch of, for example, 10,000 documents that have been selected from the document universe and classified. Using a typical example, it takes about 15 seconds to classify a batch of 10,000 documents and about 1 second to fill the secondary queues. Then it takes only milliseconds to refill the primary queue each time one or more documents are handed off to reviewers.

As the human reviewers confirm either relevance or non-relevance of the potentially relevant documents in the primary queue, the models used for classifying the batches are periodically updated using the relevance/non-relevance of reviewed documents as feedback from the human reviewers. In some embodiments, non human reviewers are used. During the 15 seconds or so the models are being retrained and updated, the reviewers continue to review documents in the primary queue. Typically, before time documents in the primary queue are used up, documents in the secondary queues reflect the retrained models are being fed into the primary queue. In this way three related processes are able to proceed asynchronously and in parallel. These are the 1) process of selecting and classifying a batch of documents for feeding the primary queue via the secondary queues; 2) the process of reviewing documents from the primary queue; and 3) the process of retraining the models using the reviewed documents. In the course of developing this technology the inventors have discovered that this keeps human reviewers more efficient in their review while continuously improving the classification models in real time and applying the model improvements to the entire universe of documents.

In some embodiments, initial document review models are created and/or trained using previously human-reviewed documents that are known to be relevant to the category with which the model is associated. Alternatively, keywords associated with the model may be used for creating and training initial document review models. In other embodiments, a previously developed document model for a particular issue, category, or tag, for example from another similar project, may be used as an initial document review model.

These systems and methods eliminate delays in presenting documents to the reviewers, while also building all models of the secondary document queues, with emphasis on less developed models in some embodiments. Thus, weaker models are strengthened with human reviewer feedback before models that are known to perform at a greater level of accuracy (e.g., correctly identify documents as relevant to a category). The systems and methods also efficiently build accurate models, where all document review models can be built to acceptable levels of accuracy requiring fewer documents to be reviewed. These systems and methods accommodate both very large and small reviews and also allow for 100% of documents to be evaluated using each model, for presentation of the best or highest relevant documents to reviewers during the review process. This allows documents that may be relevant to two or more categories to be identified and categorized. In some embodiments, many categories can be analyzed and categorized.

These and other advantages of the present disclosure are described in greater detail below with reference to the collective drawings.

For context, continuous active machine learning as it applies to document review is an iterative process to build one or more models that are each capable of identifying content relevant to a specific issue (e.g., category). It is an iterative process where a document expected to be relevant is selected from the document collection and displayed to a reviewer. The reviewer decides if the document is relevant or non-relevant. The decision of relevance or non-relevance for that document is used to refine the model so that in the future the system will more accurately identify documents to present to the reviewer. It is noteworthy that both relevant and non-relevant documents may be useful in refining the mode.

The systems and methods of the present disclosure are able to obtain and continuously update a list of relevant and non-relevant documents and create and continuously update one or more mathematical models describing the relevant documents. These systems and methods can also apply the models to documents that have not been reviewed to classify the documents, that is, to determine the likelihood of the document relevance to the models. The systems and methods also deliver highly likely relevant documents from the total collection of documents when requested by a reviewer. In some embodiments, the systems and methods disclosed herein handle multiple issues and models simultaneously, while locating and identifying relevant documents among very large collections of documents.

Problems addressed by this technology include an understanding that as more documents are reviewed, it requires more time to calculate a model. Moreover, as more documents are included in the collection or universe of documents, it requires more time to evaluate the entire collection. As more issues are included, it becomes more likely that relevant documents for some of the issues will be sparsely populated in the document collection, and as more issues are included, it becomes more complicated to ensure all models are being built. It will also be understood that as more reviewers are added, it becomes more difficult to provide all of them with relevant documents on demand.

Providing the most likely relevant documents available on demand to all reviewers is also advantageous. As a review project increases the number of documents/issues/reviewers, it can take longer to build models and identify documents than it does for reviewers to categorize them. This can result in wait time for reviewers as the system tries to identify the next document. For example, a document universe of a million documents could typically take 25-30 minutes to classify the entire document universe. A batch of 10,000 documents selected from the document universe might require only 10-15 seconds to classify.

The present disclosure addresses these issues in various new and unique ways. Prior to discussion of example embodiments of systems and methods of the present disclosure, a set of definitions are discussed for context. As used herein, a project is represented by a set of documents, a set of models, and a set of tags. In various embodiments, a document is a file that is provided in textual format, graphics format, and mixed text and graphics. In various embodiments, document content includes text, images, graphs, drawings, videos, audio, animation, media, and/or the like. Typically text is analyzed by a classifier using models based on text information. However, any of these elements may be the related to a tag and models may be built for the elements that contribute to classification of the document. For example, a tag may include a named person, and face recognition may be used to classify documents that include images to determine a probability that the document is about the person. The original format of the document may be different (e.g., email, Word, PDF, jpeg, mpeg, etc.)

A tag is an issue or a category provided by the user. The terms "tag," "issue," and "category" may be used interchangeably throughout this specification. Generally, a given project includes multiple tags. However, it is also contemplated that a project may have a single tag. Examples of tags include contracts, language, country, financial data, travel documents, person of interest, review articles, technical articles, engineering data, confidentiality agreements, advertising claims, employee compensation, allegations of fraud, and/or the like.

In various embodiments, a model comprises an algorithm or equation that can be applied to a document to determine the probability that document is relevant (responsive) to that model. A high probability indicates that document is likely to be about the tag or issue. A low probability indicates that document is not likely to be about the tag or issue. A model may be used by a classifier to analyze documents for relevance to a tag. A relevant document, also called responsive, could be responsive for several tags. In some embodiments, a model comprises a parameter array trained and configured for use by an algorithm or equation to analyze the documents. A parameter array of a model may be 1, 2, 3, or more dimensional, and may include 1; 2; 4; 8; 10; 100; 1,000 10,000; 100,000; 1,000,000; or more parameters. Parameters may be represented using arrays of binary values, octal numbers, hexadecimal numbers, BCD numbers, integers, rational numbers, irrational numbers, complex numbers, floating point numbers, text, and/or the like.

A model may be trained using documents that have known properties. For example, a model may be calculated using a set of both responsive documents and a set of non-responsive documents that have been reviewed by human reviewers. Similarly, a model may be trained using keywords, for example applying equations to a number and identity of various keywords in a document.

The quality of a model may be characterized or evaluated using three measures:
(1) Precision−>Number of True Positives/(Number of True Positives+Number of False Positives);
(2) Recall−>Number of True Positives/(Number of True Positives+Number of False Negatives)
(3) f1—A harmonic mean of the Precision and Recall.

As new document reviews are added to the project, the models associated with tags are recalculated and updated. The f1 score of a model may be used (e.g., as a threshold) for determining an endpoint or stopping point of the document review process.

Classification is the process of applying a model to a document to generate a probability that the document is relevant to a tag associated with the model. Another term is categorize. The terms "classify" and "categorize" may be used interchangeably throughout this specification. When a document is classified using multiple models, a probability may be calculated to indicate a relevance or probability for each model. A classified document may be represented in a variety of ways. For example, a plurality of probabilities, each representing a model may be appended to a document identifier or otherwise incorporated into a document reference. In some embodiments, the plurality of probabilities are appended or otherwise incorporated into the document. The probabilities may be incorporated as text, numeric data, or metadata. In other embodiments, a classification includes a document identifier (ID) and the associated plurality of probabilities. Then, placing or moving a classified document to a primary and/or secondary queue may involve moving only the document ID to the primary and/or secondary queues, with or without the associated plurality of probabilities. A document reference comprises a document identifier and one or more probabilities. The document identifier may indicate where in the document universe or other document database, the document may be found. Each of the probabilities associated with the document or document ID may be based on a different tag.

A document probability is a measure of how likely the document is to be relevant to the category for which it is being evaluated. A probability may be represented as a number between 0.0 and 1.0 or a percentage. The terms "relevance" and "probability" may be used interchangeably throughout this specification. For example, an email may be determined to be 85% likely to be relevant to the category of "financial records" because of included data that are indicative of accounting information for a company. A document may have multiple probabilities including one or more for each tag or model.

A document review may be performed by a human, machine or other entity. A document review differs from a classification in that the document review typically generates a probability of either 1 or 0, whereas a classification may generate a probability between 0.0-1.0.

FIG. 1 illustrates an example system 100 that includes a document review area 102, a primary document queue 104, a plurality of secondary queues 106A-D, a document classifier 108, an unprocessed (e.g., not reviewed) document repository 110, a modeling system 112, a set of reviewed documents 114 and a set of models 116A-D calculated for a respective set of tags, the tags stored in optional models storage 116.

Generally, the system 100 comprises several independent processes that are executed or performed simultaneously. The document review area 102 is where a human reviewer views and classifies a document. The reviewed documents are then transferred from the human reviewers to the set or collection of reviewed documents 114.

The primary and secondary document queues serve to sequence documents continuously to the human reviewer. The primary document queue 104 holds documents that are most likely to be relevant, for be presentation to reviewers. The plurality of secondary queues 106A-D, one for each document review model or tag, each hold documents that are most likely to be relevant to each respective tag, which are to be provided to the primary document queue 104. For simplicity, FIG. 1 illustrates four secondary queues 106A-D. However, more or fewer secondary queues 106 may be used.

The document classifier 108 may sequentially walk through the collection of documents not reviewed 110. The documents not reviewed 110 are illustrated as being grouped into batches 110A, 110B, 110C, . . . 110n. For simplicity, only four batches are illustrated. However, the documents not reviewed 110 may be grouped into more or fewer batches. For example, a document universe may be grouped into 100 or more batches. The document classifier 108 selects a batch of documents (e.g., batch 110B) from the documents not reviewed 110. The document classifier 108 then classifies every document in the batch 110E using every model. A probability that the document is relevant to each model is calculated and associated with the document. Upon completing the classification, the document classifier 108 may select documents from the batch 110E for inserting or placing into the secondary queues 106A-D, as described elsewhere herein, and select the next batch (e.g., 110C) for processing. The classifier may select batches at random instead of sequentially walking through the collection of documents not reviewed 110. In some embodiment the contents of each batch may be selected at random. The size of the batch may be specified by a number of documents in a batch or a number of bytes in a batch. For example, a batch may be limited to 10,000 documents or 100 megabytes of data, whichever is less. In some embodiments, a different module (not illustrated) performs batching and selecting of documents for the classifier 108. In the interests of simplicity these operations are illustrated as combined in the classifier 108.

In accordance with the present disclosure, when the document classifier 108 completes classifying the batch of documents, the probabilities of those classified documents having the highest probabilities for each model are compared to the probabilities of those documents already in a corresponding secondary queue. The document classifier 108 then refreshes each queue with the documents having the highest probabilities for a specified number of documents for each model.

In one embodiment illustrated in FIG. 1, the documents in the batch are sorted according to probability. They may be sorted as the documents are classified. Alternatively, a list of the four documents in the batch having the highest probabilities as calculated using the model 116A are maintained during classification of the batch. Upon completing the classification of the batch, the documents in the batch having the four highest probabilities as calculated using model 116A are compared with the documents remaining in the secondary queue 106A. The classified documents in the batch may be inserted into a position in the secondary queue according to probability of the classified documents and documents in the secondary queue 106A. Alternatively, the documents in the batch having the four highest probabilities may be collected together with the documents remaining in the secondary queue 106A and then the collection may be sorted. The four documents having the highest probabilities in the collection may then be inserted or placed into the secondary queue 106A. For simplicity, FIG. 1 illustrates each secondary queue 106A-D having four documents. However, secondary queues 106A-D may have more or fewer documents in each of their respective queues. For example, each secondary queue may have 20 documents or more. Each of the remaining queues 106B-D may be refreshed in a similar manner.

With respect to the plurality of secondary queues 106A-D, it will be understood that each issue of interest has an associated model and secondary queue that is tied to the associated model. Using the above procedures, each secondary queue 106A-D can maintain a list of the documents having the highest probability of being relevant to the tag for the respective model (top documents). In some embodiments, each secondary queue 106A-D includes 20 documents and can be refreshed several times a minute from a combination of the top documents already in the respective secondary queue and the top documents in the latest classified batch.

In some embodiments, the primary document queue 104 comprises at least one of the top documents from each of the secondary queues 106A-D. The documents in the primary document queue 104 are available for immediate delivery to the document review area 102 for a human reviewer. The primary document queue 104 of FIG. 1 contains four documents. In some embodiments, the primary queue contains 10 documents. More or fewer documents may be included in the primary document queue 104.

The sizes of the batch 110A-n, the primary queues 104, and/or the secondary queues 106A-D may be parameters that are adjustable for optimizing speed and throughput. For simplicity, the specification describes moving documents between the document universe 110, the batches 110A-n, the secondary queues 106A-D, the primary queue 104, and/or the reviewed document collection 114. However, a document reference may be used for moving information about the document instead of the actual document. The concept of moving a document may be used interchangeably with the concept of moving a document reference for many of the operations described in the specification and claims.

When a document is requested for review by a human the document at the top of primary document queue 104 is taken from the primary document queue 104 (popped) and delivered to the document review area 102. A secondary queue may be selected and a document may be immediately popped from the top of the selected secondary queue 106A-D and pushed to the bottom of the primary document queue 104. The secondary queue may be selected in round-robin fashion, cycling through secondary queues 106A, 106B, 106C, 106D, 106A . . . and so on. Alternatively, emphasis may be given to a secondary queue 106 having the lowest developed model. The term f1 may be used to identify the secondary queue 106 having the lowest developed model. FIG. 1 illustrates four documents in the primary document queue 104, and each of the four secondary document queues 106A-D. FIG. 1 also illustrates four models 116A-D and four batches 110A-n. However, each of these numbers may be different and each may be different from one or more of the others.

For simplicity, the case where only one document is popped from the primary queue at a time is illustrated. However, multiple documents at a time may be popped from the top of a primary queue in response to one request. In some embodiments, replacement documents that are pushed to the bottom of the primary queue come from a single selected secondary queue. Alternatively, some or all of the multiple replacement documents comes from various different secondary queues. In some embodiments, each of the multiple replacement documents come from a different secondary queue. The selection of the secondary queues may be made as described above.

The document review area 102 allows a potentially relevant document to be displayed to a human reviewer. The reviewer considers each tag or issue and determines if the document is relevant or non-relevant to each tag. If the document is relevant, the reviewer may select the issue, e.g., clicking on the issue in a graphical user interface in which the document is displayed. When the reviewer has selected all relevant issues in the document, the selections are saved. The document can then be added to human reviewed document list 114.

According to some embodiments, every n-number of documents that are reviewed triggers model recalculation within the system 100. The trigger number may be based on the number of documents in the primary document queue 104, for example, if the primary queue includes 10 documents, then the model may be recalculated or retrained every tenth document review. In the alternative, the trigger may be more or fewer than the number of documents in the primary document queue 104. The trigger number may also be configurable according to parameters applied to the quality of the classifications or throughput.

The modeling system 112 is where reviewed documents may be analyzed to recalculate models for providing new/updated models. In some embodiments, the modeling system 112 runs as an independent process and is initiated after a (configurable) trigger number of documents have been reviewed by human reviewers, or some other event, such as elapsed time or a number of batches that have been classified. Upon initiation of training of the models, the modeling system 112 may collect documents that have been manually reviewed by a human. All of the documents that have been reviewed in the project may be collected. After collection, the modeling system 112 can analyze collected documents and train each document review model 116A-D using a general algol or specified algorithm that is unique for each particular category. The document review models 116A-D may be saved to model storage 116 to be applied using the document classifier 108 to unprocessed documents and/or documents in the secondary queues 106A-D.

When the modeling system 112 has completed calculating and updating the document review models 116A-D, documents in the plurality of secondary queues 106A-D may be collected. These collected documents are re-evaluated (re-classified) using new/updated document review models 116A-D, respectively. The documents in the secondary queues 106A-D are updated with new document probabilities and may be resorted according to those probabilities. It is noteworthy that since the models 116A-D are continually improved (e.g., every ten reviewed documents) the quality of the documents presented for review may continually improve.

The process continues looping through each batch in turn until all of the documents in the set of documents not reviewed 110 have been classified and considered for placement into a secondary queue. It is noteworthy that as a result of the process illustrated in FIG. 1, each of the newly reviewed documents are very likely to include at least one relevant and at least one non-relevant document for retraining each model.

The processes running on the system 100 may be initiated using a set of initial document models 116A-D. As described elsewhere herein, these initial document models 116A-D may be generated using human classification of documents from the set of documents not reviewed 110, keywords received from various sources, or imported document models. The initial models 116A-D may be used to classify a batch of documents from the documents not reviewed 110 and populate the secondary queues 106. Then one or more documents may be popped from the top of each of the secondary queues 106A-D and pushed to the bottom of the primary queue 104 until the primary queue 104 is full. A document may be popped from the top of the primary queue 104 and transferred to the document review area 102 for review by a human. From that point on, the procedures described using the batches, primary queues, and secondary queues may proceed.

Figure 2:
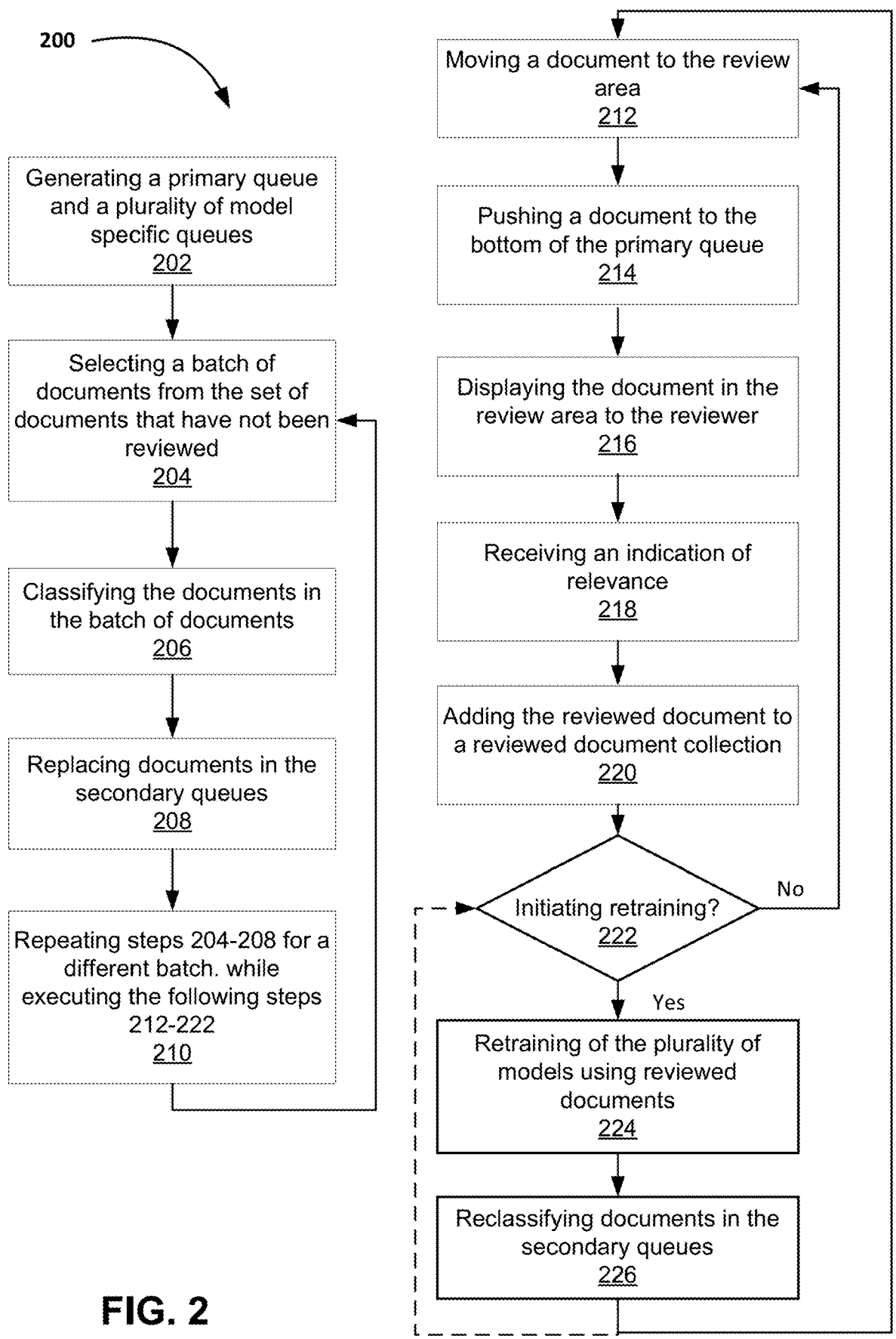
FIG. 2 is a flowchart of an example method of the present disclosure for categorizing unprocessed documents using various models.

FIG. 2 is a flowchart of an example method of document processing according to the present disclosure. In some embodiments, the method includes a step 202 of generating a primary queue, and a plurality of model specific secondary queues. Each of the secondary queues may be specific to one of a plurality of models. The document specific secondary queues each include a plurality of documents that have been classified by one of the plurality of models. Each model may be associated with a unique category or tag and trained to generate a probability that a document is relevant to the tag. Examples of tags include names of individuals, locations, relationships between entities, and so forth.

The method then includes a step 204 of selecting a batch of documents from the set of documents that have not been reviewed. A typical size of a batch may be about 10,000 documents selected from a document universe of a million or more documents that have not been reviewed by a human reviewer.

Once this batch of documents has been selected, the method includes a step 206 of classifying the documents in the batch of documents. The documents may be classified using the plurality of models. Classification includes evaluating the batch of documents using each of the plurality of models. In other words, each of the plurality of document review models may be applied to each of documents in the batch to determine a probability for each model that the document is relevant to the tag associated with the model. A document may be relevant to more than one tag or category.

Once these documents are classified, the method includes a step 208 of updating documents in each of the model specific secondary queues. Updating the model specific secondary queues may be accomplished by replacing one or more documents in the model specific secondary queue with a classified document that has a higher probability from the batch. In some embodiments, updating the model specific secondary queues is accomplished by inserting one or more classified documents from the batch into the secondary queue such that the documents in the secondary queue retain an order of probability. As a result, the documents in the secondary queues will have higher probabilities after the secondary queues are updated. The replacement may result in the probabilities of the documents in the model specific second queue being in decreasing order of probability.

At step 210 the method returns to step 204 where a new batch is selected for classification in step 206 and used as a source of more relevant documents for updating the secondary queues in step 208. While the method cycles through the steps 204-210, the steps 212-222 may be executed asynchronously, and without stopping the cycle through steps 204-210. Periodically, steps 224 and 226 may be executed.

At step 212 the method includes moving a document to the review area. The document may be removed from the top of the primary queue and placed in the review area for review by a human.

To replace the document popped from the top of the primary queue, the method includes the step 214 pushing a document to the bottom of the primary queue. A document may be popped from the top of a selected secondary queue and pushed to the bottom of the primary stack. The document popped from the top of the selected secondary stack may be removed from the secondary stack.

The primary queue may be thought of as a first-in-first-out stack. Similarly, the secondary queues may be thought of as first-in-first-out stacks. Documents are removed from the top of the stack (popped), or documents are added to the bottom of the stack (pushed). Other types of stacks or queues may be used for the primary and secondary queues. The document may be popped from the top of a selected secondary queue and the pushed to the bottom of the primary queue. In some embodiments, the secondary queue that provides the document to the primary queue is selected at random from the plurality of secondary queues. The secondary queue may be selected based on the relevance of documents in the plurality of secondary queues. Alternatively, the source of the pushed document may be cycled sequentially through the plurality of secondary queues in a round-robin fashion. Upon adding a document to the review area, that document may be removed from the set or list of documents that have not been reviewed. At step 216 the method includes displaying the document in the review area to the reviewer. The document in the document review area may be displayed to a human reviewer using a graphical user interface that permits the viewer to examine the document and presents a selection of categories for the reviewer's selection.

At step 218 the method includes receiving an indication of relevance. The reviewer's selections may be received, providing an indication of relevance or non-relevance of the displayed document for each of the plurality of tags or categories. The reviewer may select categories that are relevant to the document and leave non-relevant categories unselected. Alternatively, the reviewer may be required to indicate for each category if the document is relevant or non-relevant, e.g., by selecting a 'relevant' box or a 'non-relevant' box in the graphical user interface. While the term reviewer (singular) is used throughout this specification, the term 'reviewers' (plural) may be used interchangeably in most places.

At step 220 the method includes adding the reviewed document to a reviewed document collection. Optionally, upon adding the reviewed document to the reviewed document collection, the reviewed document is removed from the set of documents that have not been reviewed. This may be accomplished by flagging the reviewed document as being reviewed. In some embodiments, a list of documents that have not been reviewed is created, for example, at or before step 202. As documents are reviewed the document ID of reviewed documents may be added to another list, i.e., a list of documents that has been reviewed, for example at step 220. Upon initiating classification of a batch of documents, for example, after step 204 but before step 206, the documents in the batch may be checked against the list of reviewed documents. Any documents in the list of reviewed documents may be simply disregarded as having already been reviewed during step 206.

At step 222 the method includes determining whether or not to initiate retraining of the models. The determination may be based on a number of documents that have been reviewed since the most recent retraining. For example, retraining may be initiated for every 10, 20, 30, 40, 50, 100, or more times that reviewed documents have been added. In some embodiments, the decision may be based on time elapsed since the most recent retraining of the models. Alternatively, the decision may be based on a number of batches that have been classified. Some combination of reviewed documents, elapsed time, and/or number of classified batches may be used.

At step 224 the method includes initiating retraining of the plurality of models using reviewed documents. All the documents in the in the reviewed document collection may be used for retraining, including those document that have been recently added. This serves to incorporate the documents that have been classified, reviewed, and added to the reviewed document collection after the most previous training of the models. The additional documents may improve the accuracy of the models.

At step 226, the method includes reclassifying documents in the secondary queues. In some embodiments, the documents in the current batch and/or primary queue may also be reclassified. The method of FIG. 2 illustrates the method returning from step 226 to step 212. However, in some embodiments, the method returns from step 226 to step 222. While a number of steps are described in method 200, namely steps 202-226, more or fewer steps may be used to perform the method 200 of FIG. 2.

Figure 3:
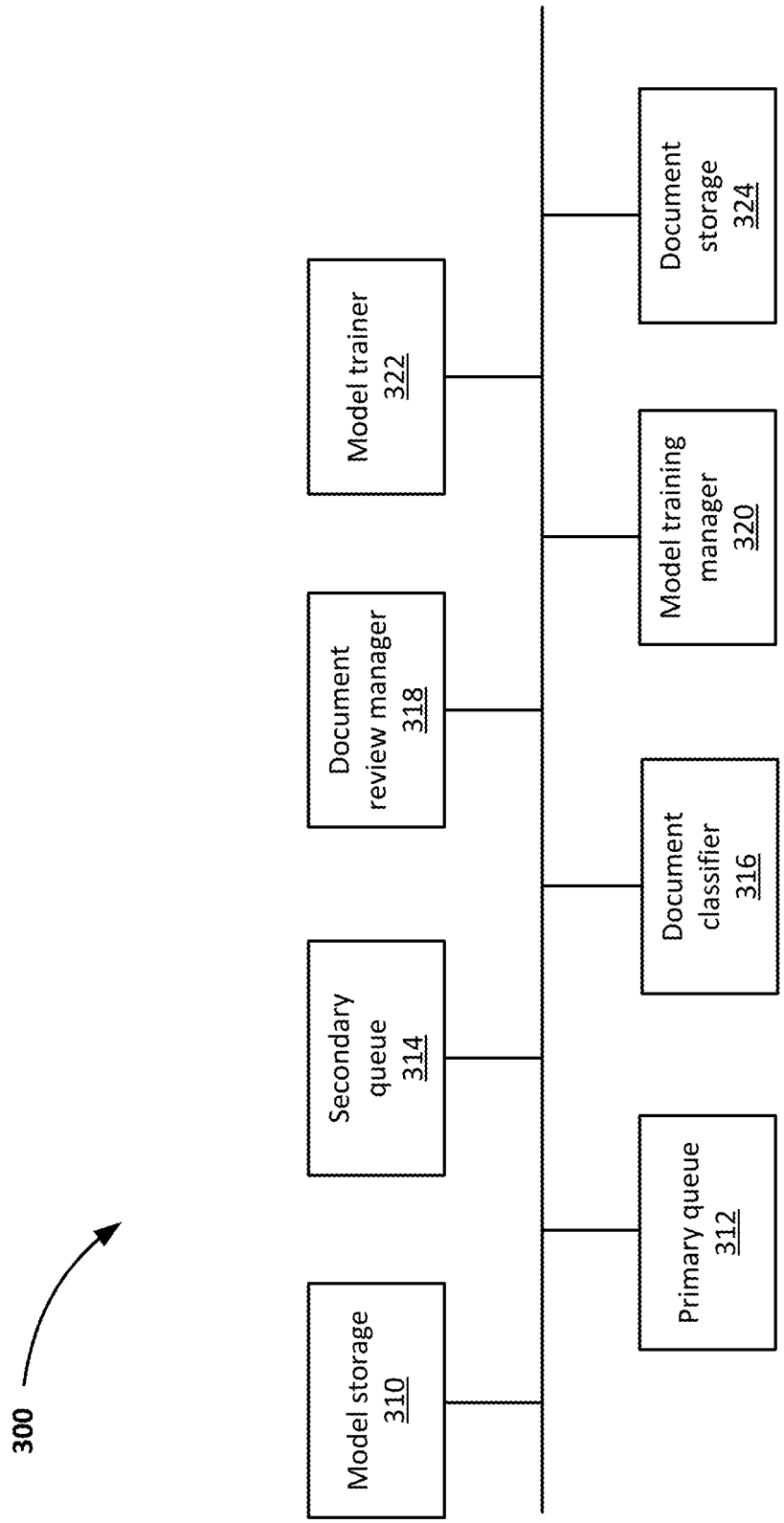
FIG. 3 illustrates a system for storing and presenting electronic documents to a reviewer.

FIG. 3 illustrates a system 300 for storing and presenting electronic documents to a reviewer while using continuous active machine learning to train a plurality of classification models. The system 300 includes a model storage 310, a primary queue 312, a secondary queue 314, a document classifier 316, a document review manager 318, a model training manager 320, a model trainer 322, and a document storage 324. The model storage may be used for storing a plurality of models. Each of the models may be trained for use in generating a probability that a document is relevant to at least one of a plurality of tags. The models 116A-D may be stored in a model storage 310 (illustrated in FIG. 1 as model storage 116).

The primary queue 312 may be used for storing documents and a plurality of associated classifications (probabilities). The plurality of probabilities each correspond to a model based on a tag. In some embodiments, the primary queue 312 may be used to store a document reference instead of the document. The document reference includes a document identifier indicating a location of the document. The document reference also includes a plurality of probabilities each correspond to a model based on a tag. The primary queue 312 is illustrated in FIG. 1 as primary queue 104.

The secondary queue 314 may be used for storing documents and a plurality of associated classifications (probabilities), or document references. The secondary queue differs from the primary queue in that the secondary queue is specific to a model or tag. That is, the documents or document references in the secondary queue are documents that have been classified and determined to have the most relevance (highest probabilities) for a specific tag. However, all of the plurality of probabilities for all of the tags calculated during classification are stored in the secondary queues 314. The documents of the secondary queues 314 are generally likely to be relevant to the specific issue or category or tag. A plurality of secondary queues is used, each secondary queue being specific to a different tag. Secondary queues are illustrated in FIG. 1 as secondary queues 106A-D.

The document classifier 316 applies a plurality of models to a batch of documents. The document classifier 316 calculates a plurality of probabilities for each document, each of the probabilities being for a different tag. In some embodiments, the document classifier selects multiple batches and processes each batch before selecting the next batch. Each batch may be a different set of documents from the previous batch. The document classifier may replace at least one document reference in each secondary queue by a document reference from the classified batch being processed. The referenced document from the classified batch will only be used for replacement if it has a higher probability of being relevant to the tag associated with the secondary queue than a document referenced in the secondary queue. The document classifier is illustrated in FIG. 1 as document classifier 108.

The document review manager 318 may move a document referenced by the document or document reference at the top of a primary queue to a document review area. In some embodiments, the document review manager 318 removes the document reference from the top of the primary queue, and pushes a document reference from the top of a selected secondary queue to the bottom of the primary queue.

In various embodiments, the document review manager 318 selects the secondary queue at random; in a sequential round-robin fashion; based on the probabilities generated for the most relevant reference in each of the queues; based on probabilities generated for all of the references in a batch; based on f1 scores for the secondary queues, and/or based on other criterion. For example, the document review manager 318 may select a secondary queue that has the lowest f1 score.

The document review manager 318 may display the document in the document review area to a human reviewer for review, and receive an indication of relevance or non-relevance of the displayed document for each of the plurality of tags, from the reviewer. In some embodiments the document review manager 318 revises the document reference for the reviewed document based on the received relevance and non-relevance indications. For example, the probability for each tag indicated as relevant by the human reviewer may be set to 1, and the probability for each tag indicated as non-relevant may be reset to 0. In various embodiments, the document review manager 318 adds the revised document reference to the reviewed document collection, or adds the document and the revised probabilities to the reviewed document collection.

The model training manager 320 may periodically initiate retraining of the plurality of models. The model training manager 320 may determine when to initiate retraining of the plurality of models. For example, the model training manager 320 may monitor a number of documents that have been reviewed and added to the model storage since the most previous retraining, and initiate retraining based on the number. In some embodiments, the model training manager 320 may initiate retraining based on elapsed time.

The model trainer 322 may use document references or documents and associated probabilities that are stored in the reviewed document collection to retrain the plurality of models. In some embodiments, the model trainer 322 uses documents and associated probabilities that are stored in the reviewed document collection to retrain the plurality of models. The model trainer is illustrated in FIG. 1 as the modeling system 112.

Document storage 324 is used for storing documents that have not yet been reviewed. In some embodiments, document storage 324 is used for storing a reviewed document collection. The metadata and probabilities may be stored with some or all of the documents stored in the document storage 324.

While eight modules are described, namely a model storage 310, a primary queue 312, a secondary queue 314, a document classifier 316, a document review manager 318, a model training manager 320, a model trainer 322, and a document storage 324, more or fewer modules may be used in the system 300 of FIG. 3.

FIG. 4 illustrates an example method 400 for updating a model specific secondary queues. This updates or refreshes a list of documents in a model specific secondary queue with the best (highest probability) documents from both those currently in the model specific secondary queue and those in the new batch. In some embodiments, the method comprises a step 402 of combining at least a portion the documents in the model specific secondary queue with the at least a portion of the classified documents in the batch.

Next, the method comprises a step 404 of sorting the combined documents. The combined documents may be sorted according to the probability that each document is relevant to a tag associated with the model specific secondary queue Next, the method comprises a step 406 of replacing documents in the secondary queue with documents from the sorted documents. Sorted documents may be a list of sorted documents or sorted document references. The documents in the model specific secondary queue may be replaced with an original number of documents in the model specific secondary queue. The documents used for the replacement may be the best documents (have the highest probabilities) from the combined documents. The replaced documents may be arranged in order of probability. While three steps are described in method 400, namely steps 402-406, more or fewer steps may be used to perform the method 400 of FIG. 4.

FIG. 5 illustrates an example method 500 for reclassifying documents after retraining a plurality of models. In some embodiments, the method comprises a step 502 of receiving a plurality of retrained models after the models have been retrained.

The method then includes a step 504 of reclassifying the documents in the plurality of secondary document queues using the retrained models. Each of the documents in all of the plurality of secondary document queues may be reclassified using all the plurality of retrained models.

Optionally, the method also includes the step 506 of reclassifying documents in the primary queue. All the documents in the primary queue may be reclassified using all of the plurality of retrained models.

Optionally, the method also includes the step 508 of reclassifying documents in the selected batch. If the selected batch has not been reclassified since the models have been retrained, all the documents in the selected batch may be reclassified using all of the plurality of retrained models. While four steps are described in method 500, namely steps 502-508, more or fewer steps may be used to perform the method 500 of FIG. 5.

Figure 6:
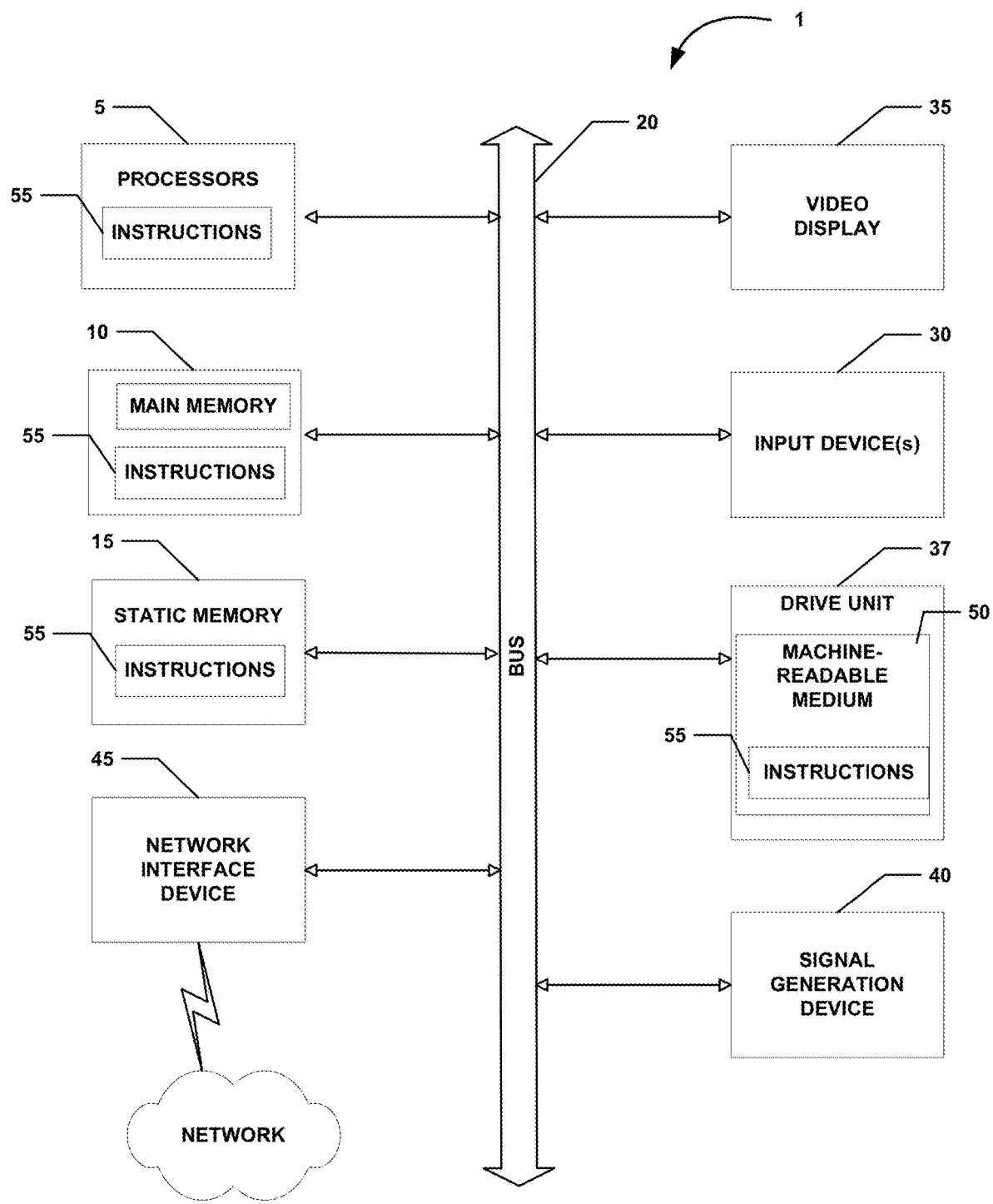
FIG. 6 is a schematic diagram of a computing system that is used to implement embodiments according to the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 105B or network 520, see FIG. 1 and FIG. 5, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for processing a set of electronic documents that have not been reviewed using continuous active machine learning, the method comprising:
    generating a primary queue and a plurality of secondary document queues, each secondary queue specific to one of a plurality of models and including a plurality of documents that have been classified using a plurality of models;
    a) selecting a batch of documents from the set of documents that have not been reviewed;
    b) classifying the batch of documents using the plurality of models, each model trained to generate a probability that the document is relevant to at least one of a plurality of tags;
    c) for each model and model specific secondary queue, replacing at least one document in the model specific secondary queue with a classified document that has a higher probability from the batch, and replacing documents removed from the secondary queue and added to the primary queue;
    d) identifying a different batch of documents for selection and returning to step a; and
    e) while repeatedly executing steps a-d:
        moving a document at the top of a primary queue to a document review area,
        pushing a document from the top of a selected secondary queue to the bottom of the primary queue,
        displaying the document in the document review area to a human reviewer for review,
        receiving from the reviewer an indication of relevance or non-relevance of the displayed document for each of the plurality of tags,
        adding the reviewed document to a reviewed document collection, and
        periodically initiating retraining of the plurality of models using reviewed documents in the reviewed document collection, the initiation of the retraining based on a number of reviewed documents that have been added to the reviewed document collection since the most recent retraining.

2. The method according to claim 1, wherein replacing at least one document in the model specific secondary queue with a classified document that has a higher probability from the batch comprises:
    combining at least a portion the documents in the model specific secondary queue with the at least a portion of the classified documents in the batch; and
    replacing the documents in the model specific secondary queue with a number of documents having the highest probabilities from the combined documents, the replaced documents arranged in order of probability.

3. The method according to claim 1, wherein replacing at least one document in the model specific secondary queue with a classified document that has a higher probability from the batch comprises:
    combining at least a portion the documents in the model specific secondary queue with the at least a portion of the classified documents in the batch;
    sorting the combined documents according to the probability that each document is relevant to a tag associated with the model specific secondary queue; and refilling the documents in the model specific secondary queue with replacement documents having the highest probabilities from the sorted combined documents, the replaced documents arranged in order of probability.

4. The method according to claim 1, wherein replacing at least one document in the model specific secondary queue with a classified document that has a higher probability from the batch comprises:
sorting the classified batch documents according to the probability that each document is relevant to a tag associated with the model specific secondary queue;
inserting the most relevant document into the model specific secondary queue at a position that preserves a sorted order of the model specific secondary queue; and
repeating insertion of progressively less relevant documents until no more positions are available in the model specific secondary queue.

5. The method according to claim 1, wherein selecting a batch of documents from the set of documents that have not been reviewed comprises selecting a predetermined number of documents or batch of documents having less than a predetermined number of bytes.

6. The method according to claim 1, wherein selecting a batch of documents from the set of documents that have not been reviewed comprises a randomly selecting the documents from the set of documents that have not been reviewed.

7. The method according to claim 1, wherein selecting a batch of documents from the set of documents that have not been reviewed comprises stepping sequentially through the set of documents that have not been reviewed until all the documents have been selected and classified and then beginning again at the beginning of the set of documents in a round-robin sequence.

8. The method according to claim 1, wherein selecting a model specific secondary queue as a source for pushing a document from the top of a selected secondary queue to the bottom of the primary queue comprises selecting a next model specific secondary queue in a round-robin sequence.

9. The method according to claim 1, wherein selecting a model specific secondary queue as a source for pushing a document from the top of a selected secondary queue to the bottom of the primary queue comprises selecting a model specific secondary queue having a lowest f1 score.

10. The method according to claim 1, further comprising after retraining of the plurality of models using reviewed documents in the reviewed document collection and before replacing at least one document in the model specific secondary queue with a classified document that has a higher probability from the batch, reclassifying the documents in all of the plurality of secondary document queues.

11. The method according to claim 1, further comprising after retraining of the plurality of models using reviewed documents in the reviewed document collection and before replacing at least one document in the model specific secondary queue with a classified document that has a higher probability from the batch:
reclassifying the documents in all of the plurality of secondary document queues;
reclassifying the documents in the batch; and
proceeding from step c.

12. The method according to claim 1, wherein generating a plurality of secondary document queues comprises:
receiving a plurality of documents, each reviewed for relevance to a plurality of tags;
training a plurality of models using the received documents each model trained to generate a probability that the document is relevant to at least one of the plurality of tags;
selecting a batch of documents from the set of documents that have not been reviewed;
classifying the batch of documents using the plurality of models; and
for each of the plurality of models, populating a secondary document queue specific to the model using the most relevant documents classified by the model.

13. The method according to claim 1, wherein generating a plurality of secondary document queues comprises:
receiving a plurality of keywords;
training a plurality of models using the received keywords each model trained to generate a probability that a document is relevant to at least one of the plurality of tags;
selecting a batch of documents from the set of documents that have not been reviewed;
classifying the batch of documents using the plurality of models; and
for each of the plurality of models, populating a secondary document queue specific to the model using the most relevant documents classified by the model.

14. The method according to claim 1, wherein generating a plurality of secondary document queues comprises:
receiving a plurality of models each model having been previously trained to be relevant to at least one of the plurality of tags;
selecting a batch of documents from the set of documents that have not been reviewed;
classifying the batch of documents using the plurality of models; and
for each of the plurality of models, populating a secondary document queue specific to the model using the most relevant documents classified by the model.

15. The method according to claim 1, wherein each of the plurality of model specific secondary queues comprises a list of a plurality of documents and a plurality of probabilities associated with each document.

16. The method according to claim 1, wherein the primary queue comprises a list of a plurality of documents and a plurality of probabilities associated with each document.

17. The method according to claim 1, wherein the batch of documents selected from the set of documents that have not been reviewed comprises a list of a plurality of documents.

18. A system for running three processes asynchronously to present electronic documents to a reviewer while using continuous active machine learning to train a plurality of classification models, the system comprising:
a document classifier to repeatedly run a first process for:
sequentially selecting a batch of documents from universe of documents that have not been reviewed,
classifying the batch of documents using the plurality of models to generate for each document a probability for each model,
updating each of a plurality of secondary queues with the best documents in the batch for a model associated with the queue, and
repeating the first process while sequentially stepping through the universe of documents to select the next batch until all the documents have been classified, and then starting over at the beginning of the universe of documents;

a document review manager to repeatedly run a second process asynchronously while the first process is running, the second process for:
  popping a document from the top of a primary queue for display to a reviewer,
  popping a document from the top of a sequentially selected secondary queue and pushing the popped document to the bottom of the primary queue,
  receiving from the reviewer an indication of relevance or non-relevance of the displayed document to each of the plurality of tags,
  updating and adding the updated document to a reviewed document collection, and
  selecting a different secondary queue and repeating the second process for the next document currently at the top of the primary queue; and
a model training manager to repeatedly run a third process asynchronously while the first and second process are running, the third process for:
  periodically initiating retraining of the plurality of models, the retraining using the reviewed documents in the reviewed document collection, and
  classifying all the documents in each the plurality of secondary queues using the retrained models.

19. A system for presenting electronic documents to a reviewer while using continuous active machine learning to train a plurality of classification models, the system comprising:
  a model storage for storing a plurality of models each trained for use in generating a probability that a document is relevant to at least one of a plurality of tags;
  a document classifier for selecting a batch of documents from a set of documents that have not been reviewed and classifying the batch of documents using the plurality of models stored in the model storage to generate a probability for each model, each subsequent batch of documents being a different set of documents from the previous batch;
  a secondary queue manager for replacing at least one document in each secondary queue of a plurality of secondary queues, each secondary queue specific to one of the plurality of models, the replaced document in the secondary queue being replaced by a classified document from the batch that has a higher probability than the replaced document in the secondary queue;
  a primary queue manager for moving a document at the top of a primary queue to a document review area, and pushing a document from the top of a selected secondary queue to the bottom of the primary queue,
  a document review manager for:
    displaying the document in the document review area to a human reviewer for review,
    receiving from the reviewer an indication of relevance or non-relevance of the displayed document for each of the plurality of tags,
    adding the reviewed document to a reviewed document collection; and
  a model training manager for periodically initiating retraining of the plurality of models based on a number of reviewed documents that have been added to the reviewed document collection since the most recent retraining; and
  a model trainer for retraining the plurality of models using the reviewed documents in the reviewed document collection and placing the retrained models into the model storage.

20. A system for presenting electronic documents to a reviewer while using continuous active machine learning to train a plurality of classification models, the system comprising:
  a model storage for storing a plurality of models each trained for use in generating a probability that a document is relevant to at least one of a plurality of tags;
  document storage for storing documents that have not been reviewed and can be referenced by a document identifier;
  a primary queue:
    containing a list of document references to classified documents, the list in the form of a stack, and
    each document reference including a document identifier and a plurality of probabilities that the identified document is relevant to a respective tag of the plurality of models;
  a plurality of secondary queues, each secondary queue:
    specific to one of the plurality of models,
    containing a list of document references to classified documents, the list in the form of a stack, and
    each document reference including a document identifier and a plurality of probabilities that the identified document is relevant to a respective tag of the plurality of models;
  a document classifier for:
    selecting batches of documents from a set of documents in the document storage that have not been reviewed, each subsequent batch of documents being a different set of documents from the previous batch,
    classifying each document in a selected batch of documents using the plurality of models, the classification using the plurality of models stored in the model storage to generate a plurality of probabilities that the document is relevant to the respective tags,
    associating each document reference with the plurality of probabilities generated for the document, and
    for each batch, replacing at least one document reference in each secondary queue by a document reference from the classified batch, the referenced document having a higher probability of being relevant to the tag associated with the secondary queue than a document referenced in the secondary queue;
  a document review manager for:
    moving a document referenced by the document reference at the top of a primary queue to a document review area,
    removing the document reference from the top of the primary queue,
    pushing a document reference from the top of a selected secondary queue to the bottom of the primary queue,
    displaying the document in the document review area to a human reviewer for review,
    receiving from the reviewer an indication of relevance or non-relevance of the displayed document for each of the plurality of tags,
    revising the document reference for the reviewed document based on the received relevance and non-relevance indications, and
    adding the revised document reference to a reviewed document collection;
  a model training manager for periodically initiating the retraining of the plurality of models based on a number of reviewed document references that have been added to the reviewed document collection since the most recent retraining; and a model trainer for retraining the plurality of models using the documents referenced in the reviewed document collection and placing the retrained models into the model storage.

* * * * *